United States Patent
Smit et al.

(10) Patent No.: US 6,446,212 B1
(45) Date of Patent: Sep. 3, 2002

(54) PROCESSOR HAVING AN EXTENDED OPERATING VOLTAGE RANGE

(75) Inventors: Willem Smit; Johannes Albertus van Niekerk, both of Chandler; Willem Jabcobus Marneweck, Tempe, all of AZ (US); Frederick J. Bruwer, Paarl (ZA)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 09/141,899

(22) Filed: Aug. 28, 1998

(51) Int. Cl.[7] .............................. G06F 1/26; G06F 1/28; G06F 1/30
(52) U.S. Cl. .............................. 713/300; 712/1; 712/32; 712/38; 323/271; 323/275
(58) Field of Search .................................. 712/1, 32, 38, 712/39, 40, 41; 323/271, 275; 364/483, 492; 713/300–340

(56) References Cited

U.S. PATENT DOCUMENTS 5,552,696 A * 9/1996 Trainor et al. ............... 323/275
5,587,916 A * 12/1996 Martinson et al. ........... 364/483
5,757,171 A * 5/1998 Babcock ....................... 323/271
5,787,014 A * 7/1998 Hall et al. .................... 364/492

* cited by examiner

Primary Examiner—Rupal Dharia
(74) Attorney, Agent, or Firm—Baker Botts L.L.P.

(57) ABSTRACT

A processing unit, preferably a RISC based microcontroller, is coupled to a processing unit voltage regulator. The processing unit voltage regulator is used for controlling an operating voltage of the processing unit. A control unit is coupled to the processing unit voltage regulator and to the processing unit for setting a regulated voltage level for the processing unit voltage regulator. A voltage supply coupled to the control unit and to the processing unit voltage regulator is provided and is used for supplying the operating voltage for the processing unit wherein the operating voltage will have an upper and lower operating voltage level and an voltage supply operating range of approximately two to eighteen volts with relatively little variation in operating current.

27 Claims, 1 Drawing Sheet

PROCESSOR HAVING AN EXTENDED OPERATING VOLTAGE RANGE

BACKGROUND OF THE INVENTION

1. Field of the Invention

This invention relates generally to processors and, more specifically, to a Reduced Instruction Set Computer (RISC) based microcontroller having an extended operating voltage range.

2. Description of the Prior Art

Presently, Reduced Instruction Set Computer (RISC) based microcontrollers operate at a voltage level of between 2.5 volts to 6.5 volts. This limited voltage range eliminates the possible use of RISC based microcontrollers without external voltage regulation in many applications. By increasing the operating voltage range of a RISC based microcontroller, one would increase the possible usage of these types of microcontrollers into different regions of application. For example, by raising the operating voltage of the RISC based microcontroller to 9 volts or 12 volts, one may use a RISC microcontroller without external voltage regulation in applications where an inexpensive 9 or 12 volt battery is the main source of power.

Therefore, a need existed to provide an improved RISC based microcontroller. The improved RISC based microcontroller must have an extended operating voltage range. The improved RISC based microcontroller must have an extended operating voltage range of approximately 2 volts to 18 volts thereby allowing the usage of these types of microcontrollers into many different types of applications.

SUMMARY OF THE INVENTION

In accordance with one embodiment of the present invention, it is an object of this invention to provide an improved RISC based microcontroller.

It is another object of the present invention to provide an improved RISC based microcontroller that has an extended operating voltage range.

It is still another object of the present invention to provide an improved RISC based microcontroller that has an extended operating voltage range of approximately 2 volts to 18 volts thereby allowing the usage of these types of microcontrollers into many different types of applications.

BRIEF DESCRIPTION OF THE PREFERRED EMBODIMENTS

In accordance with one embodiment of the present invention, a processor having an extended operating voltage range is disclosed. A processing unit, preferably a RISC based microcontroller, is coupled to a processing unit voltage regulator. The processing unit voltage regulator is used for controlling an operating voltage of the processing unit. A control unit is coupled to the processing unit voltage regulator and to the processing unit for setting a regulated voltage level for the processing unit voltage regulator. A voltage supply coupled to the control unit and to the processing unit voltage regulator is provided and is used for supplying the operating voltage for the processing unit. The operating voltage is characterized as a variable voltage range with a selectable upper and lower operating voltage limits. Furthermore, the processor will not be subject to a current penalty in the selection of one operating voltage over another.

The processor may further have a high voltage input/output (I/O) port coupled to the voltage supply. The high voltage I/O port is used for allowing peripheral devices which operate at the operating voltage supplied by the voltage supply to be coupled to the processing unit. High voltage interface logic is coupled to the high voltage I/O port and the processing unit for allowing communication compatibility between the peripheral devices coupled to the high voltage I/O port and the processing unit.

The processor may further have an I/O regulator coupled to the voltage supply. The I/O regulator is used for supplying a regulated I/O device voltage level. This regulated I/O voltage may or may not be the same voltage level as the regulated processing unit voltage.

A regulated I/O port is coupled to the I/O regulator for allowing peripheral devices which operate at the regulated I/O device voltage level to be coupled to the processing unit. Interface logic is coupled to the regulated I/O port and the processing unit for allowing communication compatibility between the peripheral devices coupled to the regulated I/O port and the processing unit.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 1:
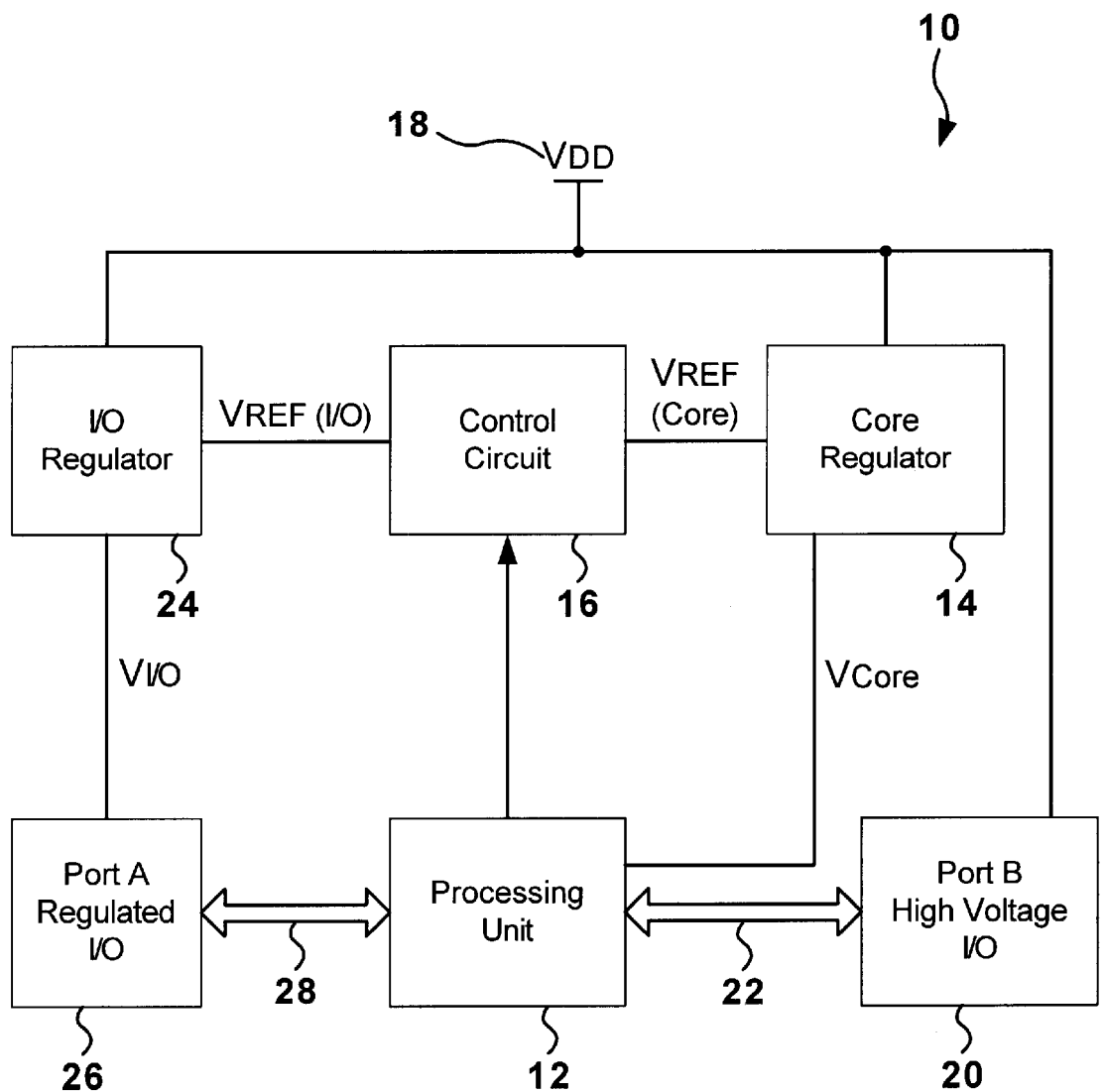
FIG. 1 is a simplified functional block diagram of the present invention.

Referring to FIG. 1, a processor 10 of the present invention is shown. The processor 10 has a processing unit 12. The processing unit 12 is a standard processor core which is known to those skilled in the art. In the preferred embodiment of the present invention, a Reduced Instruction Set Computer (RISC) based microcontroller core is used. In alternative embodiments, other types of microprocessors and microcontrollers may also utilize this invention (e.g. Complicated Instruction Set Computer (CISC), Digital Signal Processor (DSP)).

A processing unit voltage regulator 14 (hereinafter regulator 14) is coupled to the processing unit 12. The regulator 14 is used for generating a regulated operating voltage to power the processing unit 12.

A control unit 16 is coupled to the regulator 14 and to the processing unit 12. The control unit 16 is used for setting the regulated voltage level of the regulator 14, $V_{REF(CORE)}$. The control unit 16 is generally a register having a plurality of bits and analog circuitry such as voltage reference generator. The plurality bits are used to set different regulated voltage levels (i.e., normal operating voltage and low power operating voltage).

A voltage power supply $V_{DD}$ 18 is coupled to the regulator 14. The regulator 14 is used for supplying an operating voltage for the processing unit 12. The voltage power supply $V_{DD}$ 18 may supply an operating voltage of variable range that has an upper and lower operating voltage level. In at least one embodiment, there is a plurality of operating voltages between an upper (e.g. normal or high speed operation) and lower (e.g. slow, sleep or low power operation) levels. Typical operating levels for another embodiment are 5 volts for normal operation and 3.5 volts for low power operation.

In the preferred embodiment of the present invention, the voltage power supply $V_{DD}$ 18 will supply a voltage range of approximately 16 volts. Furthermore, in the preferred embodiment of the present invention, the lower voltage limit is two volts and the upper limit is 18 volts. However, those skilled in the art of processor design will recognize that other voltage ranges of slightly greater or less values and with different upper and lower limits are possible and perform substantially the same function.

The processor 10 may include high voltage input/output (I/O) ports 20. The high voltage I/O ports 20 are coupled directly to the voltage power supply $V_{DD}$ 18. The high voltage I/O ports 20 are used to allow peripheral devices which operate at the operating voltage supplied by the voltage power supply $V_{DD}$ 18 to be coupled to the processing unit 12. The high voltage I/O ports 20 can swing rail to rail from 0 volts to $V_{DD}$. Since the peripheral devices coupled to the high voltage I/O port 20 may be operating at voltage level higher than the processing unit 12, high voltage interface logic 22 is coupled between the high voltage I/O ports 20 and the processing unit 12. The high voltage interface logic 22 is used for allowing communication compatibility between the peripheral devices coupled to the high voltage I/O port 20 and the processing unit 12.

An I/O regulator 24 may also be coupled to the voltage power supply $V_{DD}$ 18 and the control unit 16. The I/O regulator 24 is used for supplying a regulated I/O device voltage level, $V_{REF(I/O)}$, to regulated I/O ports 26 which are coupled to the I/O regulator 24. $V_{REF(I/O)}$ may be a different voltage level from $V_{REF(CORE)}$.

The control unit 16 functions in the same manner as it does for the regulator 14. The control unit 16 is used to set the regulated I/O device voltage level of the I/O regulator 24, $V_{REF(I/O)}$. The regulated I/O ports 26 are used for allowing peripheral devices which operate at the regulated I/O device voltage level to be coupled to the processing unit 12. Interface logic 28 is coupled to the regulated I/O ports and the processing unit 12 for allowing communication compatibility between the peripheral devices coupled to the regulated I/O port and the processing unit 12.

Operation

On start-up of the processor 10, the control circuit 16 will set the regulator 14 to a predetermined operating voltage, $V_{REF(CORE)}$ of the processing unit 12. The control circuit 16 will further set the I/O regulator 24 to an I/O device voltage level $V_{REF(I/O)}$, which may or may not be the same as the operating voltage of the processing unit 12. The regulator 14 internally regulates the voltage power supply $V_{DD}$ 18. In the preferred embodiment, the voltage power supply $V_{DD}$ 18 can have a voltage range between 2 volts and 18 volts.

The regulator 14 functions as a regulator while $V_{DD}>V_{REF(CORE)}$ ($V_{REF(CORE)}$ being the regulated voltage set by the control unit 16). If $V_{DD}<V_{REF(CORE)}$, the regulator 14 simply passes through $V_{DD}$, resulting in low voltage operation and a wide external operating range. Thus, as an example, with $V_{REF(CORE)}$ set at 5.5 volts, and $V_{DD}$ at 3 volts, the internal processing unit voltage is 3 volts. However, with $V_{DD}$ at 12 volts, the internal processing unit voltage is 5.5 volts.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A microcontroller processor unit having an extended operating voltage range comprising, in combination on a single chip:

a processing unit;

a processing unit voltage regulator coupled to said processing unit for controlling an operating voltage of said processing unit;

a control unit coupled to said processing unit voltage regulator and said processing unit for setting a regulated voltage level of said processing unit voltage regulator, said control unit further comprises a register having a plurality of bits for setting said regulated voltage level of said processing unit voltage regulator; and a voltage supply coupled to said processing unit voltage regulator for supplying said operating voltage for said processing unit wherein said operating voltage will have an upper and lower operating voltage level, and said processing unit voltage regulator functions as a voltage regulator for voltages above said regulated voltage level and said regulator passes said operating voltage for voltages below said regulated voltage level;

wherein said processor draws substantially the same current at said upper and said lower operating voltage levels.

2. A microcontroller processor having an extended operating voltage range in accordance with claim 1 wherein said processing unit is a Reduced Instruction Set Computer (RISC) based microcontroller core.

3. A microcontroller processor having an extended operating voltage range in accordance with claim 1 wherein said control unit provides an operating voltage range of approximately 16 volts.

4. A microcontroller processor having an extended operating voltage range in accordance with claim 1 wherein said upper operating voltage level of said voltage supply is greater than seven (7) volts.

5. A microcontroller processor having an extended operating voltage range in accordance with claim 1 wherein said upper operating voltage level of said voltage supply is approximately 18 volts.

6. A microcontroller processor having an extended operating voltage range in accordance with claim 1 wherein said lower operating voltage level of said voltage supply is approximately two (2) volts.

7. A microcontroller processor having an extended operating voltage range in accordance with claim 1 wherein said control unit further comprises an analog circuit for generating a reference voltage.

8. A microcontroller processor having an extended operating voltage range in accordance with claim 1 further comprising:

a high voltage input/output (I/O) port coupled to said voltage supply for allowing peripheral devices which operate at said operating voltage supplied by said voltage supply to be coupled to said processing unit; and high voltage interface logic coupled to said high voltage I/O port and said processing unit for allowing communication compatibility between said peripheral devices coupled to said high voltage I/O port and said processing unit.

9. A microcontroller processor having an extended operating voltage range in accordance with claim 1 further comprising:

an I/O regulator coupled to said voltage supply for supplying a regulated I/O device voltage level;

a regulated I/O port coupled to said I/O regulator for allowing peripheral devices which operate at said regulated I/O device voltage level to be coupled to said processing unit; and interface logic coupled to said regulated I/O port and said processing unit for allowing communication compatibility between said peripheral devices coupled to said regulated I/O port and said processing unit.

10. A microcontroller processor having an extended operating voltage range in accordance with claim 9 wherein said control unit is coupled to said I/O regulator for setting said regulated I/O device voltage level of said I/O regulator.

11. A microcontroller processor unit having an extended operating voltage range comprising, in combination on a single chip:

a RISC microcontroller core;

a processing unit voltage regulator coupled to said RISC microcontroller core for controlling an operating voltage of said RISC microcontroller core;

a control unit coupled to said processing unit voltage regulator and said RISC microcontroller core for setting a regulated voltage level of said processing unit voltage regulator;

a voltage supply coupled to said processing unit voltage regulator for supplying said operating voltage for said RISC microcontroller core wherein said operating voltage will have an upper and lower operating voltage level, and said processing unit voltage regulator functions as a voltage regulator for voltages above said regulated voltage level and said regulator passes said operating voltage for voltages below said regulated voltage level;

a high voltage input/output (I/O) port coupled to said voltage supply for allowing peripheral devices which operate at said operating voltage supplied by said voltage supply to be coupled to said processing unit;

high voltage interface logic coupled to said high voltage I/O port and said processing unit for allowing communication compatibility between said peripheral devices coupled to said high voltage I/O port and said processing unit;

an I/O regulator coupled to said voltage supply for supplying a regulated I/O device voltage level;

wherein said control unit is coupled to said I/O regulator for setting said regulated I/O device voltage level of said I/O regulator, said control unit is a register having a plurality of bits for setting said regulated voltage level of said processing unit voltage regulator;

a regulated I/O port coupled to said I/O regulator for allowing peripheral devices which operate at said regulated I/O device voltage level to be coupled to said processing unit; and interface logic coupled to said, regulated I/O port and said processing unit for allowing communication compatibility between said peripheral devices coupled to said regulated I/O port and said processing unit.

12. A microcontroller processor having an extended operating voltage range in accordance with claim 11 wherein said processor draws substantially the same current at said upper and said lower operating voltage levels.

13. A microcontroller processor having an extended operating voltage range in accordance with claim 11 wherein said control unit provides an operating voltage range of approximately 16 volts.

14. A microcontroller processor having an extended operating voltage range in accordance with claim 11 wherein said upper operating voltage level of said voltage supply is greater than seven (7) volts.

15. A microcontroller processor having an extended operating voltage range in accordance with claim 11 wherein said upper operating voltage level of said voltage supply is approximately 18 volts.

16. A microcontroller processor having an extended operating voltage range in accordance with claim 11 wherein said lower operating voltage level of said voltage supply is approximately two (2) volts.

17. A microcontroller processor having an extended operating voltage range in accordance with claim 11 wherein said control unit further comprises an analog circuit for generating a reference voltage.

18. A microcontroller processor unit having an extended operating voltage range comprising, in combination on a single chip:

a processing unit;

a processing unit voltage regulator coupled to said processing unit for controlling an operating voltage of said processing unit;

a control unit coupled to said processing unit voltage regulator and said processing unit for setting a regulated voltage level of said processing unit voltage regulator, said control unit is a register having a plurality of bits for setting said regulated voltage level of said processing unit voltage regulator;

a voltage supply coupled to said processing unit voltage regulator for supplying said operating voltage for said processing unit wherein said operating voltage will have an upper and lower operating voltage level, wherein said processing unit voltage regulator functions as a voltage regulator for voltages above said regulated voltage level and said regulator passes said operating voltage for voltages below said regulated voltage level;

a high voltage input/output (I/O) port coupled to said voltage supply for allowing peripheral devices which operate at said operating voltage supplied by said voltage supply to be coupled to said processing unit; and high voltage interface logic coupled to said high voltage I/O port and said processing unit for allowing communication compatibility between said peripheral devices coupled to said high voltage I/O port and said processing unit.

19. A microcontroller processor having an extended operating voltage range in accordance with claim 18 wherein said processor draws substantially the same current at said upper and said lower operating voltage levels.

20. A microcontroller processor having an extended operating voltage range in accordance with claim 18 wherein said processing unit is a Reduced Instruction Set Computer (RISC) based microcontroller core.

21. A microcontroller processor having an extended operating voltage range in accordance with claim 18 wherein said control unit provides an operating voltage range of approximately 16 volts.

22. A microcontroller processor having an extended operating voltage range in accordance with claim 18 wherein said upper operating voltage level of said voltage supply is greater than seven (7) volts.

23. A microcontroller processor having an extended operating voltage range in accordance with claim 18 wherein said upper operating voltage level of said voltage supply is approximately 18 volts.

24. A microcontroller processor having an extended operating voltage range in accordance with claim 18 wherein said lower operating voltage level of said voltage supply is approximately two (2) volts.

25. A microcontroller processor having an extended operating voltage range in accordance with claim 18 wherein said control unit further comprises an analog circuit for generating a reference voltage.

26. A microcontroller processor unit having an extended operating voltage range in accordance with claim 18 further comprising:

an I/O regulator coupled to said voltage supply for supplying a regulated I/O device voltage level;

a regulated I/O port coupled to said I/O regulator for allowing peripheral devices which operate at said regulated I/O device voltage level to be coupled to said processing unit; and interface logic coupled to said regulated I/O port and said processing unit for allowing communication compatibility between said peripheral devices coupled to said regulated I/O port and said processing unit.

27. A microcontroller processor having an extended operating voltage range in accordance with claim 18 wherein said control unit is coupled to said I/O regulator for setting said regulated I/O device voltage level of said I/O regulator.

\* \* \* \* \*